(12) United States Patent
Barbieri

(10) Patent No.: US 7,894,709 B2
(45) Date of Patent: Feb. 22, 2011

(54) VIDEO ABSTRACTING

(75) Inventor: Mauro Barbieri, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1124 days.

(21) Appl. No.: 10/568,375

(22) PCT Filed: Aug. 4, 2004

(86) PCT No.: PCT/IB2004/051383

§ 371 (c)(1), (2), (4) Date: Feb. 14, 2006

(87) PCT Pub. No.: WO2005/017899

PCT Pub. Date: Feb. 24, 2005

(65) Prior Publication Data

US 2006/0239644 A1    Oct. 26, 2006

(30) Foreign Application Priority Data

Aug. 18, 2003 (EP) .................................. 03102566

(51) Int. Cl.
- H04N 5/92 (2006.01)
- H04N 9/82 (2006.01)
- H04N 9/80 (2006.01)
- H04N 11/00 (2006.01)
- H04N 7/00 (2006.01)

(52) U.S. Cl. ................. 386/244; 386/245; 386/246; 386/247; 386/248; 348/468; 348/478; 348/476

(58) Field of Classification Search .............. 386/46, 386/52, 55, 95, 244–248; 348/468, 478, 348/476

See application file for complete search history.

(56) References Cited

U.S. PATENT DOCUMENTS 5,649,060 A    7/1997    Ellozy et al.

(Continued)

FOREIGN PATENT DOCUMENTS

WO    WO02093910    11/2002

OTHER PUBLICATIONS

Jasinschi, et al., "Integrated Multimedia Processing for Topic Segmentation and Classification", Proceedings 2001 international Conference on Image Processing, ICIP 2001, Thessaloniki, Greece, Oct. 7-10, 2001, vol. 1, No. 3, Conf. 8, pp. 366-369.

(Continued)

*Primary Examiner*—Thai Tran
*Assistant Examiner*—Daquan Zhao

(57) ABSTRACT

A slave clock may be synchronized to a master clock by means of a synchronization signal sent from the master to the slave clock side of the link. The synchronization signal may be an expected signal pattern sent at intervals expected by the slave side. The slave clock may correlate received signals with a representation of the expected synchronization signal to produce a correlation sample sequence at a first sample rate which is related as n times the slave clock rate. A best interpolation may in turn be further refined by estimating between interpolator outputs adjacent to the best interpolation output. The synchronization signal receipt time thus determined is compared to the expected time based upon the slave clock, which is adjusted until the times match. The best interpolation may in turn be further refined by estimating between interpolator outputs adjacent to the best interpolation output.

11 Claims, 2 Drawing Sheets

U.S. PATENT DOCUMENTS

Figure 1:
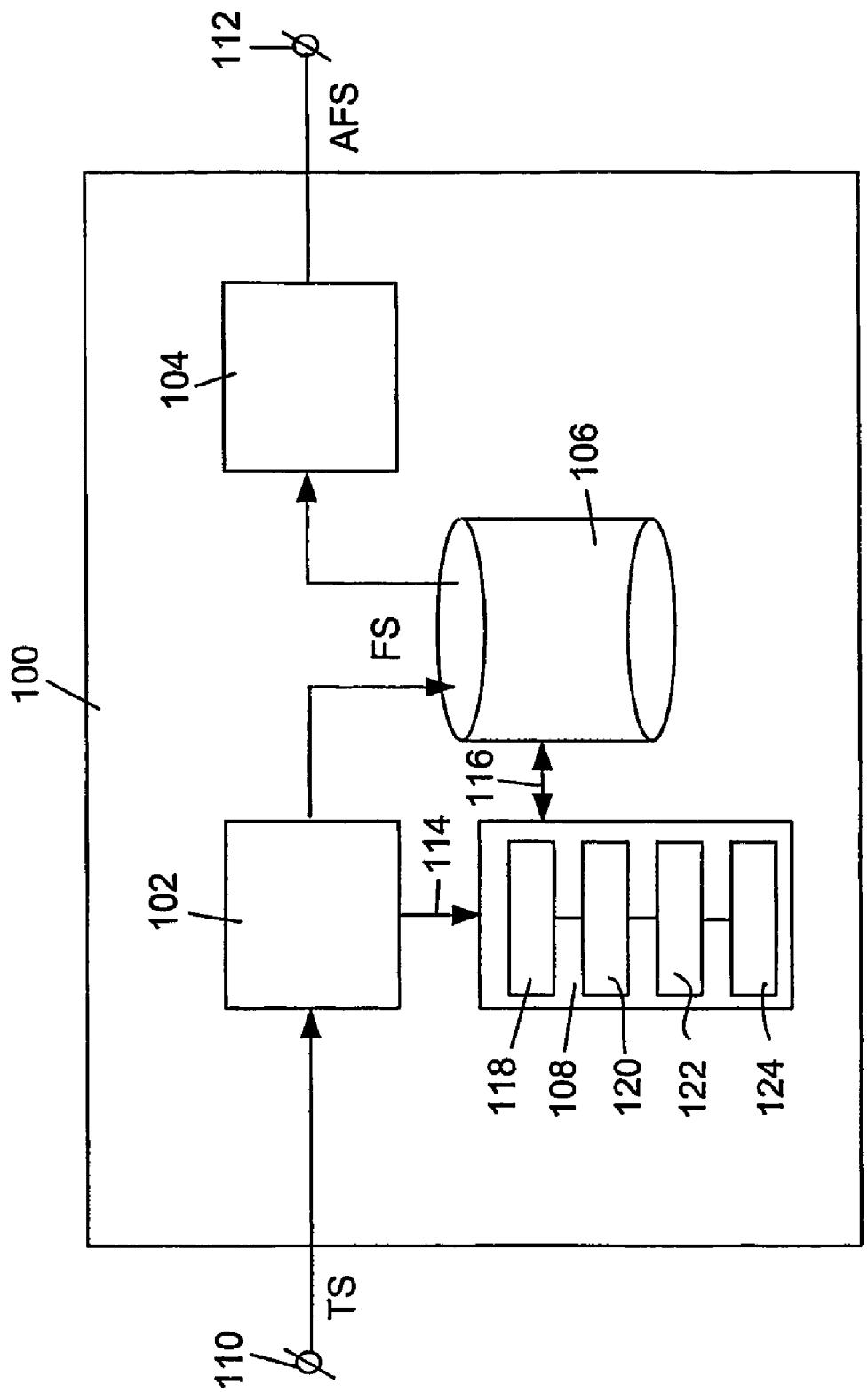

| | | | |
|---|---|---|---|
| 5,703,655 A * | 12/1997 | Corey et al. | 348/468 |
| 5,781,687 A | 7/1998 | Parks | |
| 6,505,153 B1 | 1/2003 | Van Thong et al. | |
| 7,046,914 B2 * | 5/2006 | Jasinschi et al. | 386/95 |
| 7,339,992 B2 * | 3/2008 | Chang et al. | 375/240.25 |
| 7,360,234 B2 * | 4/2008 | Robson et al. | 725/127 |
| 2002/0076112 A1 | 6/2002 | Devara | |
| 2002/0099744 A1 | 7/2002 | Coden et al. | |
| 2003/0021342 A1 | 1/2003 | Nesvadba et al. | |

OTHER PUBLICATIONS

Watanabe, et al., "Automatic Caption Generation for Video Data, Time Alignment Between Caption and Acoustic Signal", Multimedia Signal Processing, 1999 IEEE 3rd Workshop in Copenhagen, Denmark, Sep. 13-15, 1999, Piscataway, NJ, US, IEEE, pp. 65-70.

Leinhart, et al., Video Abstracting Communications of the Associateion for Computing Machinery, Association for Computing Machinery, New York, US, vol. 40, No. 12, Dec. 1997, pp. 55-62.

* cited by examiner

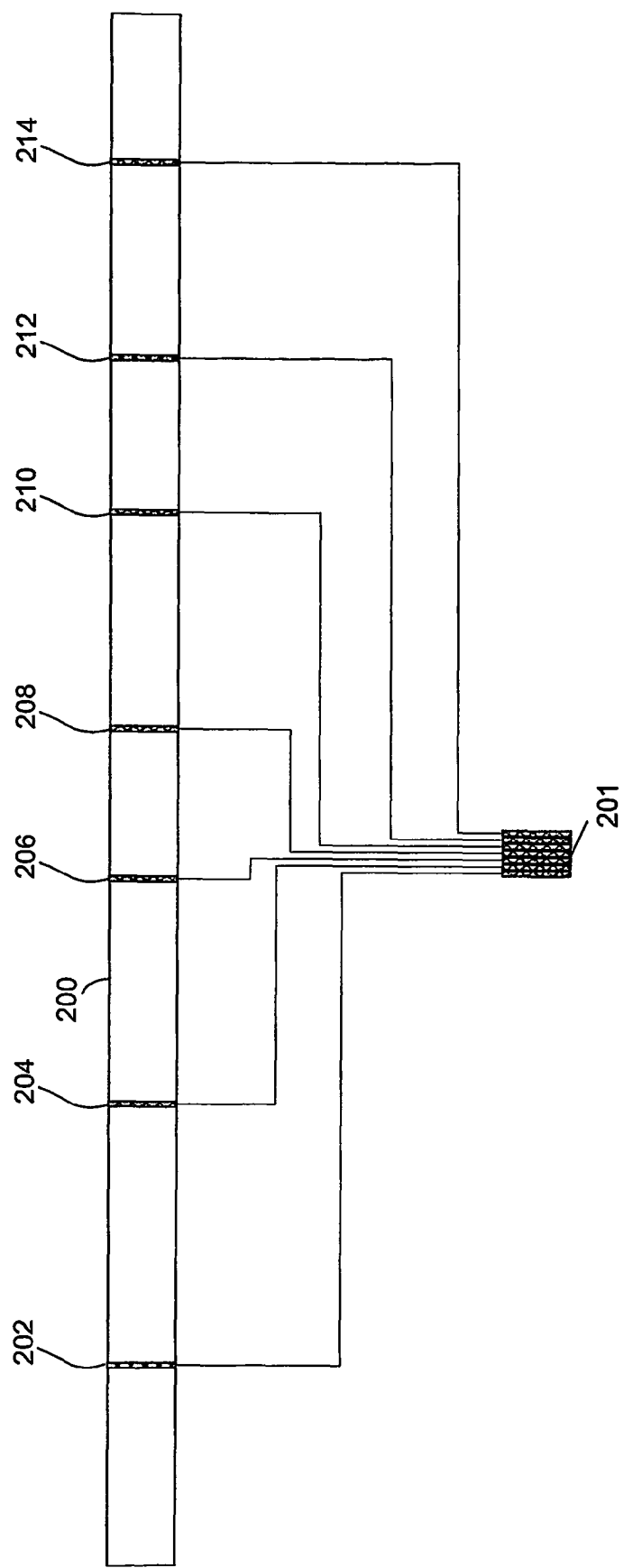

VIDEO ABSTRACTING

The invention relates to a method of creating a collection of relevant video segments by selecting respective portions from a video stream which corresponds to a program, a first duration of the collection of relevant video segments being relatively short compared with a second duration of the program.

The invention further relates to a video segment compilation unit for creating a collection of relevant video segments by selecting respective portions from a video stream which corresponds to a program, a first duration of the collection of relevant video segments being relatively short compared with a second duration of the program.

The invention further relates to a video storage system comprising:

a receiving unit for receiving a video stream;

storage means for storage of the video stream and for storage of a collection of relevant video segments being selected from the video stream; and a video segment compilation unit for creating the collection of relevant video segments, as described above.

The invention further relates to a computer program product to be loaded by a computer arrangement, comprising instructions to create a collection of relevant video segments by selecting respective portions from a video stream which corresponds to a program, a first duration of the collection of relevant video segments being relatively short compared with a second duration of the program, the computer arrangement comprising processing means and a memory.

The amount of audio-video information that can be accessed and consumed in people's living rooms has been ever increasing. This trend may be further accelerated due to the convergence of both technology and functionality provided by future television receivers and personal computers. To select the audio-video information that is of interest, tools are needed to help users extract relevant audio-video information and to effectively navigate through the large amount of available audio-video information. To allow users to get a quick overview of the recorded audio-video information, and to decide whether to view an entire recorded program, an interesting feature is the automatic generation of video trailers. When a program has been or is recorded, the recorded program is analyzed in order to select relevant video segments from the video stream. By afterwards displaying the relevant video segments the user is provided with a nice overview of the recorded program.

An embodiment of the method of the kind described in the opening paragraph is known from the article "Video Abstracting", by R. Lienhart, et al., in Communications of the ACM, 40(12), pages 55-62, 1997. This article discloses that video data may be modeled in four layers. At the lowest level, it consists of a set of frames; at the next higher level, frames are grouped into shots or continuous camera recordings, and consecutive shots are aggregated into scenes based on storytelling coherence. All scenes together make the video. The concept of a clip is described as a frame sequence being selected to be an element of the abstract; a video abstract thus consists of a collection of clips. The known method comprises three steps: segmentation and analysis of the video content; clip selection and clip assembly. The goal of the analysis step is to detect special events such as close-ups of the main actors, gunfire, explosions and text. A disadvantage of the known method is that it is relatively complex and not robust.

It is an object of the invention to provide method of the kind described in the opening paragraph which is relatively easy.

This object of the invention is achieved in that the method comprises:

receiving transcript information associated with the program, the transcript information comprising a plurality of sentences;

detecting a first exclamatory syntactical element in a first one of the sentences;

selecting a first one of the portions from the video stream, which corresponds to the first exclamatory syntactical element; and associating the first one of the portions with a first one of the relevant video segments.

With an exclamatory syntactical element is meant an exclamation mark, a word being expressed with capitals, a sentence comprising words being expressed with capitals, a word being expressed with underlined characters, a word being expressed with italic characters, a word being expressed with bold characters, or a word being expressed with relatively large characters compared with other characters in other sentences.

The transcript information is e.g. represented as closed-captioned, as subtitles being exchanged by means of teletext or as subtitles being exchanged and/or stored as graphical data to be merged with images of the video stream, resulting in overlaid text.

In general, sentences that end with exclamation marks correspond to interesting video segments that can be included in a video preview, either a video abstract or a video trailer, to cause curiosity and hold attention. In subtitles and closed captions, a sentence has all the words capitalized when it is said or expressed loudly, e.g. a person shouting. The segments associated to these sentences are preferably used to make a video preview more catchy and interesting.

An embodiment of the method according to the invention further comprises filtering out relatively short sentences comprising a first word being equal to a second word of a particular set of words. The set of words might comprise the words "yes", "no" and "thanks". In other words, frequently occurring short sentences such as "Yes!" "No!" etc. are filtered out because these are regarded as less important.

In an embodiment of the method according to the invention the order of the selected portions is changed. By viewing the selected portions in the correct order, i.e. corresponding to the order as in the original program, there is a probability that too much of the story is revealed. By changing the order this probability is reduced.

It is another object of the invention to provide a video segment compilation unit of the kind described in the opening paragraph which is arranged to create a collection of relevant video segments in a relatively easy way.

This object of the invention is achieved in that video segment compilation unit comprises:

receiving means for receiving transcript information associated with the program, the transcript information comprising a plurality of sentences;

detecting means for detecting a first exclamatory syntactical element in a first one of the sentences;

selecting means for selecting a first one of the portions from the video stream, which corresponds to the first exclamatory syntactical element; and associating means for associating the first one of the portions with a first one of the relevant video segments.

It is another object of the invention to provide a video storage system of the kind described in the opening paragraph which is arranged to create a collection of relevant video segments in a relatively easy way.

This object of the invention is achieved in that the video segment compilation unit of the video storage system, comprises:

receiving means for receiving transcript information associated with the program, the transcript information comprising a plurality of sentences;

detecting means for detecting a first exclamatory syntactical element in a first one of the sentences;

selecting means for selecting a first one of the portions from the video stream, which corresponds to the first exclamatory syntactical element; and associating means for associating the first one of the portions with a first one of the relevant video segments.

In an embodiment of the video storage system according to the invention the storage means comprises a hard-disk. In another embodiment of the video storage system according to the invention the storage means is arranged to store the video stream on a removable memory device, i.e. removable storage medium, like an optical-disk. A video segment compilation unit in accordance with the invention could be included, for example, in a television set, a computer, a video recorder (VCR), a DVD recorder, a set-top box, satellite-tuner or other apparatus in the field of consumer electronics.

It is another object of the invention to provide a computer program product of the kind described in the opening paragraph which is relatively easy.

This object of the invention is achieved in that the computer program product, after being loaded, provides said processing means with the capability to carry out:

receiving transcript information associated with the program, the transcript information comprising a plurality of sentences;

detecting a first exclamatory syntactical element in a first one of the sentences;

selecting a first one of the portions from the video stream, which corresponds to the first exclamatory syntactical element; and associating the first one of the portions with a first one of the relevant video segments.

Modifications of the method and variations thereof may correspond to modifications and variations thereof of the video segment compilation unit of the video storage system and of the computer program product, being described.

These and other aspects of the method, of the video segment compilation unit of the video storage system and of the computer program product according to the invention will become apparent from and will be elucidated with respect to the implementations and embodiments described hereinafter and with reference to the accompanying drawings, wherein:

FIG. 1 schematically shows an embodiment of a recording and reproducing apparatus according to the invention; and FIG. 2 schematically shows the creation of a video summary on basis of a program, according to the invention.

Same reference numerals are used to denote similar parts throughout the figures.

A program might be a television program as broadcast by a television station, i.e. television broadcaster. Typically the television program will be watched by means of television sets. However a program might also be provided by another type of content provider, e.g. by means of the Internet. In that case the program might be watched by other types of equipment than television sets. Alternatively the program is not broadcast but exchanged by means of removable media, like optical-disks or cassette tapes. In this disclosure examples are described in which the program is a television program. It will be clear that the invention has a broader scope.

A television signal comprises picture information, sound information and additional information, such as for example teletext information. The television signal transmits a television program. The television program can comprise a movie or film, an episode of a series, a captured reproduction of a theater performance, a documentary or a sports program. These types of information of the television program may be interrupted by a plurality of units of commercial-break information and announcement information. Each commercial-break usually comprises a plurality of commercial messages.

FIG. 1 schematically shows an embodiment of a recording and reproducing apparatus 100 according to the invention. This recording and reproducing apparatus 100 is a hard-disk based video storage system. The recording and reproducing apparatus 100 is adapted to record a television signal FS contained in the received signal TS and to reproduce a recorded television signal AFS. The received signal TS may be a broadcast signal received via an antenna or cable but may also be a signal from a storage device like a VCR (Video Cassette Recorder) or Digital Versatile Disk (DVD). The received signal TS is provided by means of the input connector 110. The reproduced television signal AFS is provided at the output connector 112 and can be displayed by means of a display device, e.g. comprised by a television set.

The recording and reproducing apparatus 100 includes:

a receiving unit 102 for receiving the signal TS. This receiving unit 102, e.g. tuner, is arranged to select the television signal FS of a television station. This television signal FS represents a video stream which corresponds to a television program 200;

a recording and reproducing means 106 for storage of the video stream as provided by the receiving unit 102. The recording and reproducing means 106 include a signal processing stage for processing the television signal FS to be recorded and for processing the reproduced television signal AFS, as is commonly known. This processing stage might include data compression. The recording and reproducing means 106 include a hard-disk as recording medium for the recording of the processed television signal FS.

an exchange unit 104 for adaptation of stored information to a reproduced television signal AFS and for transmission of this a reproduced television signal AFS via the output connector 112, e.g. to a television set. The adaptation might include modulation on a carrier of the television signal FS representing the video stream. The stored information comprises the video stream as provided by the receiving unit 102 and a collection of relevant video segments; and a video segment compilation unit 108 for creating such a collection of relevant video segments by selecting respective portions from the video stream which corresponds to the television program. The purpose of this video segment compilation unit 108 is to create a video trailer or alternatively a video abstract of the video stream. Hence the duration of the collection of relevant video segments is relatively short compared with the duration of the television program. E.g. a television program takes about 1 or 2 hours and the duration of the collection of relevant video segments is in the range of seconds to minutes. That means e.g. from 10 seconds to 2 minutes. As a consequence each of the relevant video segments lasts only a few seconds. On user request the duration of the relevant video segments to be selected might be shorter or longer. It is not required that all relevant video segments have the same length. The creation of the collection of relevant video segments can be performed during the recording of the video stream or after the recording has finished. In the former case the video stream is provided by means of connection 114 and in the latter case the video stream is provided by means of connection 116.

The video segment compilation unit 108 comprises:

a transcript information receiving unit 118 for receiving transcript information associated with the program. The transcript information comprises a plurality of sentences and might be implemented as closed-captioned text, as subtitles being exchanged by means of teletext or as subtitles being exchanged as or stored as graphical data to be merged with images of the video stream, resulting in overlaid text;

a text analysis unit 120 for detecting exclamatory syntactical elements in the sentences. An exclamatory syntactical element might be an exclamation mark, a word being expressed with capitals, a sentence comprising words being expressed with capitals, a word being expressed with underlined characters, a word being expressed with italic characters, a word being expressed with bold characters, or a word being expressed with relatively large characters compared with other characters in other sentences. The detection of subtitles is preferably based on the method as disclosed in WO2002093910. The following two articles disclose further appropriate techniques for text detection in video streams: "MPEG-7 VideoText Description Scheme for Superimposed Text", by N. Dimitrova, L. Agnihotri, C. Dorai, R Bolle, in International Signal Processing and Image Communications Journal, September, 2000; "Text Detection for Video Analysis", by L. Agnihotri, N. Dimitrova, in IEEE Workshop on Content-based Access of Image and Video Libraries, Colorado, June '99;

a video selection unit 122 for selecting the portions 202-214 from the video stream 200, which correspond to the exclamatory syntactical elements. The selection unit 122 is arranged to determine the start and stop moments of the presence of the exclamatory syntactical elements. The begin and end of the respective portions 202-214 preferably match with these start and stop moments; and an associating unit 124 for associating the selected portions 202-214 with the relevant video segments. The collection of relevant video segments can be stored as a number of copies of the respective portions of the original video stream. But preferably only a set of pointers is stored. The pointers indicate start or stop locations within the video stream corresponding to begin or end, respectively of the selected portions of the video stream. The collection of relevant video segments, as video data or as pointers, can be stored in the same memory device as applied for the storage of the original video stream or in a separate memory device. It will be clear that in the case of a recording and reproducing apparatus which is based on a removable storage medium it is preferred that both video stream and collection of relevant video segments are stored on the same storage medium.

Preferably content analysis algorithms are used in conjunction with the proposed method to align the selected video segments to proper video or audio scene boundaries or to include special event sequences, e.g. explosions, car chases.

The automatically generated trailers can be used to browse video material. It can serve to browse programs that are recorded. Especially in combination with automatic profile based recording this is an interesting feature. The user needs some way to select from the recorded programs which ones to watch. A generated trailer is an option that fits well with the lean back mode of enjoying television.

The transcript information receiving unit 118, the text analysis unit 120, the video selection unit 122 and the associating unit 124 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

FIG. 2 schematically shows the creation of a video trailer or video abstract 201 on basis of a television program 200, according to the invention. The television program 200 comprises a number of scenes and shots. It is assumed that transcript information related to that television is available. By selecting relatively small portions 202-214 of the video stream which belong to parts of the transcript information, comprising exclamatory syntactical elements, fragments of relatively important scenes of the television program are gathered. Hence, the collection of relevant video segments is very well suitable as a video trailer or video abstract. Typically the selected portions 202-214 of the video stream have a duration of a few seconds [1-10 seconds]. The duration of the selected video segments might be equal to a predetermined value. But preferably the duration is determined by the duration of the occurrence of the exclamatory syntactical element. Alternatively, the duration is controllable by a user. Optionally the duration of the video segments is related to the duration of the television program. E.g. if the duration of the television program is long then the duration of the selected video segments might be relatively short. Optionally the duration of the video segments is related to the number of detected exclamatory syntactical elements in the television program. E.g. if the number of the exclamatory syntactical elements is limited then the duration of the selected video segments might be relatively long.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A method of creating a collection of relevant video segments by selecting respective portions from a video stream, wherein the video stream corresponds to a program of audio-video information, a duration of the collection of relevant video segments being relatively short compared with a duration of the program, the method comprising:

receiving a signal containing transcript information associated with the program, the transcript information including a plurality of sentences;

detecting from the signal containing transcript information exclamatory syntactical elements in the sentences, the exclamatory syntactical elements being indicative of catchy and interesting video segments that may be desirable in a video preview;

selecting portions from the video stream corresponding to the exclamatory syntactical elements;

associating the selected portions with relevant video segments; and generating the video preview in the form of a video trailer or video abstract comprising a collection of relevant video segments, wherein the respective selected portions from the video stream make up the collection of relevant video segments of the video preview that can be used as an overview to browse the program of audio-video information and provide a way to select from various recorded programs which ones to watch, wherein the exclamatory syntactical elements are selected from the group consisting of: exclamation marks, words being expressed with capitals when the words in the transcript are predominantly expressed with lower case letters, sentences comprising words being expressed with capitals when the sentences in the transcript are predominantly expressed with initial capital letters and lower case letters, words being expressed with underlined characters, words being expressed with italic characters, words being expressed with bold characters when the words in the transcript are predominantly expressed without underlining, italic characters or bold characters, and words being expressed with relatively large characters compared with other characters in other sentences in the transcript.

2. The method as claimed in claim 1, wherein the transcript information is one of closed-captioned text, subtitles being exchanged by means of teletext, and subtitles being exchanged as overlaid text.

3. The method as claimed in claim 1, wherein said method further comprises the step of:
filtering out relatively short sentences of the transcript information, wherein the relatively short sentences comprise a first word being equal to a second word of a particular set of words.

4. The method as claimed in claim 3, wherein the particular set of words comprises the words "yes", "no" and "thanks".

5. The method as claimed in claim 1, wherein said method further comprises the step of:
changing an order of the respective selected portions in the collection of relevant video segments, for reducing a probability that too much of a story of the program is revealed by the video preview.

6. A video segment compilation unit for creating a collection of relevant video segments by selecting respective portions from a video stream, wherein the video stream corresponds to a program of audio-video information, a duration of the collection of relevant video segments being relatively short compared with a duration of the program, the video segment compilation unit comprising:
receiving means for receiving a signal containing transcript information associated with the program, the transcript information including a plurality of sentences;
detecting means for detecting from the signal containing transcript information exclamatory syntactical elements in the sentences, the exclamatory syntactical elements being indicative of catchy and interesting video segments that may be desirable in a video preview;
selecting means for selecting portions from the video stream corresponding to the exclamatory syntactical elements;
associating means for associating the selected portions with relevant video segments; and
generating means for generating the video preview in the form of a video trailer or video abstract comprising a collection of relevant video segments, wherein the respective selected portions from the video stream make up the collection of relevant video segments of the video preview that can be used as an overview to browse the program of audio-video information and provide a way to select from various recorded programs which ones to watch, wherein the exclamatory syntactical elements are selected from the group consisting of: exclamation marks, words being expressed with capitals when the words in the transcript are predominantly expressed with lower case letters, sentences comprising words being expressed with capitals when the sentences in the transcript are predominantly expressed with initial capital letters and lower case letters, words being expressed with underlined characters, words being expressed with italic characters, words being expressed with bold characters when the words in the transcript are predominantly expressed without underlining, italic characters or bold characters, and words being expressed with relatively large characters compared with other characters in other sentences in the transcript.

7. A video storage system comprising:
a receiving unit for receiving a video stream;
storage means for storage of the video stream and for storage of a collection of relevant video segments being selected from the video stream; and
the video segment compilation unit as claimed in claim 6, for creating the collection of relevant video segments.

8. The video storage system as claimed in claim 7, wherein the storage means comprises a hard-disk.

9. The video storage system as claimed in claim 7, wherein the storage means is arranged to store the video stream on a removable memory device.

10. The video storage system as claimed in claim 9, wherein the removable memory device comprises an optical-disk.

11. A non-transitory computer readable medium embodied with a computer program to be loaded by a computer arrangement, comprising instructions to create a collection of relevant video segments by selecting respective portions from a video stream, wherein the video stream corresponds to a program of audio-video information, a duration of the collection of relevant video segments being relatively short compared with a duration of the program, the computer arrangement comprising processing means and a memory, the computer program, after being loaded in the memory for execution by the processing means, providing said processing means with the capability to carry out:
receiving a signal containing transcript information associated with the program of audio-video information, the transcript information including a plurality of sentences;
detecting from the signal containing transcript information exclamatory syntactical elements in the sentences, the exclamatory syntactical elements being indicative of catchy and interesting video segments that may be desirable in a video preview;
selecting portions from the video stream corresponding to the exclamatory syntactical elements;
associating the selected portions with relevant video segments; and
generating the video preview in the form of a video trailer or video abstract comprising a collection of relevant video segments, wherein the respective selected portions from the video stream make up the collection of relevant video segments of the video preview that can be used as an overview to browse the program of audio-video information and provide a way to select from various recorded programs which ones to watch, wherein the exclamatory syntactical elements are selected from the group consisting of: exclamation marks, words being expressed with capitals when the words in the transcript are predominantly expressed with lower case letters, sentences comprising words being expressed with capitals when the sentences in the transcript are predominantly expressed with initial capital letters and lower case letters, words being expressed with underlined characters, words being expressed with italic characters, words being expressed with bold characters when the words in the transcript are predominantly expressed without underlining, italic characters or bold characters, and words being expressed with relatively large characters compared with other characters in other sentences in the transcript.

* * * * *